(12) United States Patent
Henschke et al.

(10) Patent No.: US 8,575,275 B2
(45) Date of Patent: Nov. 5, 2013

(54) COMPOSITIONS AND ARTICLES PREPARED THEREFROM

(75) Inventors: Olaf Henschke, Huenenberg-See (CH); Gabriele Goethel, Merseburg (DE)

(73) Assignee: Dow Global Technologies LLC, Midland, MI (US)

( * ) Notice: Subject to any disclaimer, the term of this patent is extended or adjusted under 35 U.S.C. 154(b) by 296 days.

(21) Appl. No.: 12/677,359

(22) PCT Filed: Sep. 3, 2008

(86) PCT No.: PCT/US2008/075092
§ 371 (c)(1),
(2), (4) Date: Jul. 12, 2010

(87) PCT Pub. No.: WO2009/035885
PCT Pub. Date: Mar. 19, 2009

(65) Prior Publication Data
US 2010/0304051 A1    Dec. 2, 2010

Related U.S. Application Data

(60) Provisional application No. 60/971,438, filed on Sep. 11, 2007.

(51) Int. Cl.
*B32B 27/28* (2006.01)
*B32B 1/08* (2006.01)
*C08L 51/06* (2006.01)
*A41G 1/00* (2006.01)

(52) U.S. Cl.
USPC ............ 525/301; 525/78; 525/74; 525/285; 525/298

(58) Field of Classification Search
USPC .............................. 525/301, 78, 74, 285, 298
See application file for complete search history.

(56) References Cited

U.S. PATENT DOCUMENTS

| | | | |
|---|---|---|---|
| 4,684,576 A | 8/1987 | Tabor et al. | |
| 5,055,526 A | 10/1991 | Sato et al. | |
| 5,066,542 A | 11/1991 | Tabor et al. | |
| 5,115,033 A | 5/1992 | Wong | |
| 5,367,022 A | 11/1994 | Kiang et al. | |
| 6,171,993 B1 | 1/2001 | Mavridis et al. | |
| 6,177,516 B1 * | 1/2001 | Hudak ............... | 525/71 |
| 6,503,984 B2 | 1/2003 | Johnson et al. | |
| 6,545,091 B1 | 4/2003 | Lee et al. | |
| 6,617,019 B2 | 9/2003 | Danner et al. | |
| 6,884,850 B2 | 4/2005 | Schauder et al. | |
| 2004/0097637 A1 | 5/2004 | Botros | |
| 2004/0249071 A1 * | 12/2004 | McFaddin et al. ............... | 525/70 |
| 2005/0256263 A1 | 11/2005 | Ward | |
| 2009/0133576 A1 | 5/2009 | Schubert et al. | |

FOREIGN PATENT DOCUMENTS

| | | |
|---|---|---|
| DE | 102007043972 A1 | 5/2009 |
| EP | 0479457 A1 | 4/1992 |
| EP | 0519617 A1 | 12/1992 |
| EP | 0791628 A1 | 8/1997 |
| EP | 0896044 A1 | 2/1999 |
| EP | 1316598 A1 | 6/2003 |
| JP | 08208915 A | 8/1996 |
| WO | 0155275 A1 | 8/2001 |
| WO | 0615201 A2 | 2/2006 |
| WO | 0730172 A1 | 3/2007 |
| WO | 0935885 A1 | 3/2009 |

OTHER PUBLICATIONS

Hacker ANTEC 2001, 2673-2674.*
BUNA EPT 2070 P product PDF (2005).*
PCT/US08/075092 Intl Search Rreport and Written Opinion.
PCT/US08/075092 IPRP.

* cited by examiner

*Primary Examiner* — Mark Kaucher

(57) ABSTRACT

The invention provides a composition comprising the reaction product of a mixture comprising the following: A) at least one functionalized ethylene-based polymer formed by reacting an ethylene-based polymer with at least one anhydride-containing compound and/or at least one carboxylic acid-containing compound; B) at least one ethylene-based polymer; C) at least one anhydride-containing compound and/or at least one carboxylic acid-containing compound; and wherein the composition comprises from 0.05 to 1.0 weight percent, based on the total weight of the composition, of one or more grafted anhydride-containing compounds and/or one or more grafted carboxylic acid-containing compounds.

16 Claims, No Drawings

COMPOSITIONS AND ARTICLES PREPARED THEREFROM

REFERENCE TO RELATED APPLICATIONS

This application claims the benefit of U.S. Provisional Application No. 60/971,438, filed on Sep. 11, 2007, fully incorporated herein by reference.

FIELD OF INVENTION

The invention provides a composition comprising the reaction product of a mixture comprising the following: A) at least one functionalized ethylene-based polymer formed by reacting an ethylene-based polymer with at least one anhydride-containing compound and/or at least one carboxylic acid-containing compound; B) at least one ethylene-based polymer; and C) at least one anhydride-containing compound and/or at least one carboxylic acid-containing compound. Such compositions are suited for use as adhesives for multi-layered pipes and other articles.

BACKGROUND OF THE INVENTION

Typical adhesives used for multilayer pipes containing an aluminum layer show high peel strength initially after pipe production, but significantly decreased peel strength after 2500 hours of temperature cycling test. There is a need for compositions that can be used as adhesives for multi-layered pipe manufacturing, and which provide improved long term peel strength and peel strength retention between pipe layers, and especially between a layer formed from an ethylene-based polymer and a layer formed from a metal, such as aluminum.

International Publication No. WO 01/55275 discloses laminated films, comprising at least one structural layer, at least one adhesive layer, and optionally at least one barrier layer, made by a high speed or fast quench film process. The adhesive layer is formed from a composition comprising the following: a) a polyethylene selected from the group consisting of conventional-HDPE, conventional-MDPE, conventional-LLDPE, conventional-VLDPE, LDPE, and a blend thereof; b) from 5 to 35 weight percent, based on the total weight of a) plus b) plus c), of an acid-grafted substantially linear polyethylene; and c) optionally, up to 30 weight percent of a hydrocarbon elastomer. The acid grafting agent is an unsaturated carboxylic acid or a derivative thereof, and the level of grafting is such that the total amount of grafting agent in the total composition (a) plus (b) plus (c)) is from 0.01 to 3 weight percent.

Japanese Publication No. 08-208915 (Abstract) discloses an adhesive polyethylene composition, prepared by grafting an unsaturated carboxylic acid, under melt kneading conditions, onto a composition comprising 99-40 weight percent of an ethylene/α-olefin copolymer (A) and 1-60 weight percent of a linear low-density polyethylene (B), and in the presence of a reaction initiator. Component A is obtained by copolymerizing ethylene with an α-olefin in the presence of a single-site catalyst (a combination of a metallocene compound of a group IV or V transition metal with an organoalumium compound and an ionic compound). Component B is prepared by copolymerizing ethylene with an α-olefin in the presence of a Ziegler or chromium catalyst. The composition may be further mixed with an ethylene/propylene copolymer rubber to form a second composition, disclosed as having improved low-temperature properties, and which can be used for coating cables and steel pipes.

U.S. Pat. No. 4,684,576 discloses succinic acid or succinic anhydride grafts of HDPE, which are blended with ungrafted LLDPE and with ungrafted LDPE to form blends having useful adhesive properties. The succinic acid or succinic anhydride groups are provided by grafting, respectively, maleic acid or maleic anhydride onto HDPE. This reference also discloses laminates of the blends on various metals and polymers.

European Patent Application No. EP 1316598A1 discloses an adhesive polymer composition comprising the following: a) a non-elastomeric polyethylene, in an amount of 40 to 97 weight percent of the total composition, and b) an elastomer. Component a) is produced in a process using a single-site catalyst, and component a), or components a) and b), are grafted with an acid grafting agent. The reference also discloses a multilayer pipe, comprising an adhesive layer which comprises said adhesive polymer composition. Preferred elastomers include ethylenevinylacetate, ethylenemethylacrylate, ethylenemethylmethacrylate, ethylenepropylacrylate and ethylenebutylacrylate.

European Patent Application No. EP 0896044A1 discloses an adhesive resin composition, which contains at least a partially or wholly graft-modified α-olefin/aromatic vinyl random copolymer, which has a graft quantity of an unsaturated carboxylic acid, or a derivative thereof, ranging from 0.01 to 30 percent by weight. This reference also discloses a laminate comprising: (i) a polyester resin layer or a polycarbonate layer, (ii) an adhesive layer formed from the above-mentioned adhesive resin composition, and (iii) a saponified olefin/vinyl acetate copolymer layer.

U.S. Pat. No. 6,617,019 discloses a composite protective coating for metal substrates, such as steel, used in fabricating metal pipe or conduit. The coating, when applied to a flat metal surface, retains its bond to the metal through cold forming processes, such as those used in making ribbed steel pipe. The coating resembles a sandwich of a reinforcing material layer between two adhesive films. An adhesive layer may be formed from a copolymer of ethylene and acrylic acid, or a hydroxphenoxy ether polymer. Other suitable polymers include homopolymers and interpolymers of ethylene modified with a reactive carboxylic acid anhydride.

European Patent Application No. 0791628A1 discloses an adhesive composition comprising a specified grafted, long-chain branched ethylene-α-olefin copolymer, and either a tackifier, or a specified ethylene-vinyl acetate copolymer, and where the density, MFR, crystallinity and graft ratio, thereof, are within specific ranges. A composition containing a tackifier can be used in a laminate, and is disclosed as having excellent adhesive strength, even in a high-temperature atmosphere. The invention also provides an adhesive composition comprising a grafted long-chain ethylene-α-olefin copolymer and an olefinic elastomer. This composition can be used as a film layer for adhesion to metals or highly polar materials.

There remains a need for adhesives with improved retained adhesion to both aluminum and polyethylene. This need is critical in multi-layer pipes containing both polyolefin layers and metal layers, and in such pipes which are used for hot water applications. There is a further need for pipes with improved adhesion and peel strength after temperature cycling, and improved security and better long-term behavior. There is also need for adhesives that can be made in a compounding extruder process, in a solid phase grafting process, and/or in reactive extrusion process. Some of these needs and others have been met by the following invention.

SUMMARY OF THE INVENTION

The invention provides a composition comprising the reaction product of a mixture comprising the following:

A) at least one functionalized ethylene-based polymer formed by reacting an ethylene-based polymer with at least one anhydride-containing compound and/or at least one carboxylic acid-containing compound;

B) at least one ethylene-based polymer;

C) at least one anhydride-containing compound and/or at least one carboxylic acid-containing compound; and wherein the composition comprises from 0.05 to 1.0 weight percent, based on the total weight of the composition, of one or more grafted anhydride-containing compounds and/or one or more grafted carboxylic acid-containing compounds.

DETAILED DESCRIPTION OF THE INVENTION

Compositions

As discussed above, the invention provides a composition comprising the reaction product of a mixture comprising the following:

A) at least one functionalized ethylene-based polymer formed by reacting an ethylene-based polymer with at least one anhydride-containing compound and/or at least one carboxylic acid-containing compound;

B) at least one ethylene-based polymer;

C) at least one anhydride-containing compound and/or at least one carboxylic acid-containing compound; and wherein the composition comprises from 0.05 to 1.0 weight percent, based on the total weight of the composition, of one or more grafted anhydride-containing compounds and/or one or more grafted carboxylic acid-containing compounds.

In one embodiment, the components are reacted using a reactive extrusion process, and preferably using an extruder.

In another embodiment, the at least one functionalized ethylene-based polymer of Component A is formed by reacting the ethylene-based polymer, in the solid state, with at least one anhydride-containing compound and/or at least one carboxylic acid-containing compound.

In another embodiment, the at least one functionalized ethylene-based polymer of Component A, is formed from an ethylene-based polymer with a melt index (I2) greater than, or equal to, 10 g/10 min, preferably greater than, or equal to, 15 g/10 min, and more greater than, or equal to, 20 g/10 min. In another embodiment, the functionalized ethylene-based polymer of Component A has a melt index (I2) from 10 g/10 min to 200 g/10 min.

In another embodiment, Component A is present in an amount from 3 to 20 weight percent, preferably from 5 to 15 weight percent, based on the total weight of the mixture.

In another embodiment, Component A is present in an amount from 3 to 20 weight percent, preferably from 5 to 15 weight percent, based on the total weight of the composition.

In another embodiment, the at least one functionalized ethylene-based polymer of Component A has a density from 0.91 g/cc to 0.96 g/cc, preferably from 0.92 g/cc to 0.96 g/cc.

In another embodiment, the at least one functionalized ethylene-based polymer of Component A has a melt index (I2) from 0.1 g/10 min to 10 g/10 min.

In another embodiment, the functionalized ethylene-based polymer of Component A is formed from an ethylene homopolymer. In a further embodiment the ethylene homopolymer has a density greater than, or equal to, 0.94 g/cc, preferably greater than, or equal to, 0.95 g/cc.

In another embodiment, the functionalized ethylene-based polymer of Component A is formed by reacting, in the solid state, an ethylene-based polymer with a melt index (I2) greater than, or equal to 10 g/10 min, preferably greater than, or equal to 15 g/10 min, and more preferably greater than, or equal to 20 g/10 min. In a further embodiment, the ethylene-based polymer is reacted with 1 to 3 weight percent maleic anhydride, based on total weight of the composition. In another embodiment the ethylene-based polymer is an ethylene homopolymer. In a further embodiment, the ethylene homopolymer has a density greater than, or equal to, 0.94 g/cc, preferably greater than, or equal to, 0.95 g/cc.

The functionalized ethylene-based polymer of Component A may comprise a combination of two or more embodiments as described herein.

In another embodiment, the at least one ethylene-based polymer of Component B is an ethylene-based interpolymer with a density from 0.91 g/cc to 0.93 g/cc.

In another embodiment, Component B is present in an amount greater than, or equal to, 40 weight percent, preferably greater than, or equal to, 45 weight percent, and more preferably greater than, or equal to, 50 weight percent, based on the total weight of the mixture.

In another embodiment, Component B is present in an amount greater than, or equal to, 40 weight percent, preferably greater than, or equal to, 45 weight percent, and more preferably greater than, or equal to, 50 weight percent, based on the total weight of the composition.

In another embodiment, the ethylene-based interpolymer of Component B is an ethylene/α-olefin interpolymer. In a further embodiment, the α-olefin is selected from the group consisting of propylene, 1-butene, 1-hexene and 1-octene. In another embodiment, the ethylene/α-olefin interpolymer is a heterogeneously branched interpolymer. In another embodiment, the ethylene/α-olefin interpolymer is a homogeneously branched linear interpolymer or homogeneously branched substantially linear interpolymer.

In another embodiment, Component B is an ethylene/α-olefin interpolymer has a density less than, or equal to, 0.93 g/cc, preferably less than, or equal to, 0.92 g/cc, and more preferably less than, or equal to, 0.91 g/cc. In another embodiment, the ethylene/α-olefin interpolymer has a density greater than, or equal to, 0.85 g/cc, preferably greater than, or equal to, 0.86 g/cc, and more preferably greater than, or equal to, 0.87 g/cc.

In another embodiment, Component B is an ethylene/α-olefin interpolymer has a density from 0.85 g/cm$^3$ to 0.93 g/cm$^3$, or from 0.86 g/cm$^3$ to 0.92 g/cm$^3$, or from 0.87 g/cm$^3$ to 0.91 g/cm$^3$.

In another embodiment, the melt index (I2) of Component A is greater than the melt index (I2) of Component B; each measured according to ASTM D-1238-04.

In another embodiment, the composition comprises from 0.05 to 1.0 weight percent, based on the total weight of the composition, of one or more grafted anhydride-containing compounds and/or one or more grafted carboxylic acid-containing compounds.

In another embodiment, the composition comprises from 0.1 to 0.8 weight percent, based on the total weight of the composition, of one or more grafted anhydride-containing compounds and/or one or more grafted carboxylic acid-containing compounds.

In another embodiment, the composition comprises from 0.1 to 0.5 weight percent, based on the total weight of the composition, of one or more grafted anhydride-containing compounds and/or one or more grafted carboxylic acid-containing compounds.

In another embodiment, the at least one anhydride-containing compound of Component C is maleic anhydride. In a preferred embodiment, Component C is maleic anhydride.

In another embodiment, the composition further comprises at least one ethylene-based interpolymer or at least one propylene-based interpolymer. In a further embodiment, the ethylene-based interpolymer or the propylene-based interpolymer is present in an amount from 10 to 50 weight percent, preferably from 15 to 45 weight percent, and more preferably from 20 to 40 weight percent, based on the total weight of the mixture.

In another embodiment, the composition further comprises at least one ethylene-based interpolymer or at least one propylene-based interpolymer. In a further embodiment, the ethylene-based interpolymer or the propylene-based interpolymer is present in an amount from 10 to 50 weight percent, preferably from 15 to 45 weight percent, and more preferably from 20 to 40 weight percent, based on the total weight of the composition.

In another embodiment, the composition further comprises a propylene-based interpolymer. In a further embodiment, the propylene-based interpolymer is a propylene/ethylene interpolymer. In another embodiment, the propylene-based interpolymer is a propylene/α-olefin interpolymer. In a further embodiment, the α-olefin is selected from the group consisting of 1-butene, 1-hexene and 1-octene.

In another embodiment, the composition further comprises an ethylene-based interpolymer. In a further embodiment, the ethylene-based interpolymer is an ethylene/α-olefin interpolymer. In yet a further embodiment, the α-olefin is selected from the group consisting of propylene, 1-butene, 1-hexene and 1-octene.

In another embodiment, the mixture further comprises at least one ethylene-based interpolymer or at least one propylene-based interpolymer. In a further embodiment, the ethylene-based interpolymer or the propylene-based interpolymer is present in an amount from 10 to 50 weight percent, preferably from 15 to 45 weight percent, and more preferably from 20 to 40 weight percent, based on the total weight of the mixture.

In another embodiment, the mixture further comprises at least one ethylene-based interpolymer or at least one propylene-based interpolymer. In a further embodiment, the ethylene-based interpolymer or the propylene-based interpolymer is present in an amount from 10 to 50 weight percent, preferably from 15 to 45 weight percent, and more preferably from 20 to 40 weight percent, based on the total weight of the composition.

In another embodiment, the mixture further comprises an ethylene-based interpolymer. In a further embodiment, the ethylene-based interpolymer is an ethylene/α-olefin interpolymer. In yet a further embodiment, the α-olefin is selected from the group consisting of propylene, 1-butene, 1-hexene and 1-octene. In another embodiment, the ethylene/α-olefin interpolymer further comprises a diene.

In another embodiment, the mixture further comprises a propylene-based interpolymer. In a further embodiment, the propylene-based interpolymer is a propylene/ethylene interpolymer. In another embodiment, the propylene-based interpolymer is a propylene/α-olefin interpolymer. In a further embodiment, the α-olefin is selected from the group consisting of 1-butene, 1-hexene and 1-octene.

In a preferred embodiment, Component A is present in an amount from 3 to 20 weight percent, preferably from 5 to 15 weight percent, based on the total weight of the mixture. In another embodiment, Component B is present in an amount from 40 to 85 weight percent, preferably from 45 to 80 weight percent, and more preferably from 50 to 75 weight percent, based on the total weight of the mixture. An inventive composition may have a combination of two or more of these embodiments.

In a preferred embodiment, Component A is present in an amount from 3 to 20 weight percent, preferably from 5 to 15 weight percent, based on the total weight of the composition. In another embodiment, Component B is present in an amount from 40 to 85 weight percent, preferably from 45 to 80 weight percent, and more preferably from 50 to 75 weight percent, based on the total weight of the composition. An inventive composition may have a combination of two or more of these embodiments.

In another embodiment, Component A is formed by reacting a high density polyethylene homopolymer with a density greater than, or equal to, 0.94 g/cc, preferably greater than, or equal to, 0.95 g/cc. In another embodiment, Component B is a heterogeneously branched, linear ethylene/α-olefin interpolymer with a density from 0.91 g/cc to 0.93 g/cc. In a further embodiment, the α-olefin is selected from 1-butene, 1-hexene, or 1-octene. An inventive composition may have a combination of two or more of these embodiments.

In another embodiment, the ethylene-based polymer used for Component A has a melt index (I2) greater than, or equal to, 10 g/10 min, preferably greater than, or equal to, 15 g/10 min, and more preferably greater than, or equal to, 20 g/10 min. In another embodiment, the ethylene-base polymer used for Component A has a density from 0.91 g/cc to 0.97 g/cc, and preferably from 0.94 g/cc to 0.965 g/cc. In another embodiment, the ethylene-base polymer used for Component A is grafted with a least one anhydride-containing compound and/or at least one carboxylic acid-containing compound in a solid state grafting process. In a further embodiment, the ethylene-base polymer is a high density polyethylene homopolymer with a density greater than, or equal to, 0.94 g/cc, preferably greater than, or equal to, 0.95 g/cc. An inventive composition may have a combination of two or more of these embodiments.

In another embodiment the composition has a density from 0.875 g/cc to 0.920 g/cc, preferably from 0.88 g/cc to 0.91 g/cc.

In another embodiment, the composition further comprises one or more additives. In a further embodiment, the one or more additives are selected from the group consisting of antioxidants, UV stabilizers, processing aids, color pigments, fillers and combinations thereof.

The inventive composition may be formed by a solid phase grafting process and a reactive extrusion process. The solid phase grafting process and reactive extrusion process are each described in Registration Number: 10 2007 043 972.7 (German Patent Office), filing date of Sep. 11, 2007, fully incorporated herein by reference.

An inventive composition may comprise one or more additional additives, including, but not limited to, primary or secondary antioxidants, UV stabilizers, processing aids, color pigments, fillers, process oils, ultraviolet light absorbers, antistatic agents, pigments, dyes, nucleating agents, slip agents, fire retardants, plasticizers, lubricants, stabilizers, smoke inhibitors, viscosity control agents, anti-blocking agents, release agents, flame resistant agents, abrasion and scratch mar additives, antimicrobial agents, antistatic agents, and crosslinking agents. Typically an inventive composition will contain one or more stabilizers, for example, antioxidants, such as Irganox™ 1010, Irganox™ 1330 and Irgafos™ 168, all supplied by Ciba Specialty Chemicals. Polymers are typically treated with one or more stabilizers before an extrusion or other melt processes.

A component of an inventive composition may comprise a combination of two or more embodiments as described herein.

An inventive composition may comprise a combination of two or more embodiments as described herein.

Ethylene-Base Polymers for Functionalized Ethylene-Based Polymers of Component A) and Ethylene-Based Polymers for Component B)

Suitable ethylene-base polymers include, but are not limited to, high density polyethylene (HDPE), linear low density polyethylene (LLDPE), very low density polyethylene (VLDPE), ultra low density polyethylene (ULDPE), homogeneously branched linear ethylene polymers, and homogeneously branched substantially linear ethylene polymers (that is homogeneously branched, long chain branched ethylene polymers).

Commercial examples of suitable ethylene-base interpolymers include commercially available HDPE, commercially available LDPE, ATTANE, AFFINITY, DOWLEX, FLEXOMER, ELITE, all available from The Dow Chemical Company; and EXCEED and EXACT available from Exxon Chemical Company.

High density polyethylene (HDPE), useful as a polyolefin resin, typically has a density of about 0.94 to about 0.97 g/cc. Typically the low density polyethylene (LDPE) is made under high-pressure, using free-radical polymerization conditions. Low density polyethylene typically has a density from 0.91 to 0.94 g/cc.

Linear low density polyethylene (LLDPE) is characterized by little, if any, long chain branching, in contrast to conventional LDPE. The processes for producing LLDPE are well known in the art, and commercial grades of this polyolefin resin are available. Generally, LLDPE is produced in gas-phase fluidized bed reactors or liquid phase solution process reactors, using a Ziegler-Natta catalyst system.

The linear low density polyethylene (LLDPE), ultra low density polyethylene (ULDPE), homogeneously branched linear ethylene interpolymers, or homogeneously branched substantially linear ethylene interpolymer, typically have polymerized therein at least one α-olefin. The term "interpolymer" used herein indicates the polymer can be a copolymer, a terpolymer, or any polymer having more than one polymerized monomer. Monomers usefully copolymerized with ethylene to make the interpolymer include the C3-C20 α-olefins, and especially propylene, 1-butene, 1-pentene, 1-hexene, 4-methyl-1-pentene, 1-heptene and 1-octene. Especially preferred comonomers include propylene, 1-butene, 1-hexene and 1-octene.

The linear low density polyethylene (LLDPE) is a heterogeneous linear ethylene interpolymer. Heterogeneous linear ethylene interpolymers include copolymers of ethylene and one or more $C_3$ to $C_8$ α-olefins. Heterogeneous ethylene interpolymers can be prepared using Ziegler-Natta catalyst systems. Both the molecular weight distribution, and the short chain branching distribution, each arising from α-olefin copolymerization, are relatively broad compared to homogeneous linear and homogeneous linear substantially linear ethylene interpolymers. Heterogeneous linear ethylene interpolymers can be made in a solution, slurry, or gas phase process using a Ziegler-Natta catalyst, and are well known to those skilled in the art. For example, see U.S. Pat. No. 4,339,507, which is fully incorporated herein by reference. Examples of suitable polymers include, but are not limited to, ethylene-based polymers, such as, DOWLEX polymers and FLEXOMER polymers.

Heterogeneously branched ethylene/alpha-olefin interpolymers differ from the homogeneously branched ethylene/alpha-olefin interpolymers primarily in their branching distribution. For example, heterogeneously branched LLDPE polymers have a distribution of branching, including a highly branched portion (similar to a very low density polyethylene), a medium branched portion (similar to a medium branched polyethylene) and an essentially linear portion (similar to linear homopolymer polyethylene). Additional examples of manufacturing techniques for making the heterogeneously branched ethylene polymer are described in U.S. Pat. No. 3,914,342 (Mitchell) and U.S. Pat. No. 4,076,698 (Anderson et al), each fully incorporated herein by reference.

Examples of catalyst suitable for preparing the heterogeneous interpolymers are described in U.S. Pat. No. 4,314,912 (Lowery et al.), U.S. Pat. No. 4,547,475 (Glass et al.), and U.S. Pat. No. 4,612,300 (Coleman, III). Examples of catalyst suitable for producing the homogeneous interpolymers are described in U.S. Pat. Nos. 5,026,798 and 5,055,438 (Canich); U.S. Pat. No. 3,645,992 (Elston); U.S. Pat. No. 5,017,714 (Welborn); and U.S. Pat. No. 4,076,698 (Anderson).

The terms "homogeneous" and "homogeneously-branched" are used in reference to an ethylene/α-olefin interpolymer, in which the α-olefin comonomer is randomly distributed within a given polymer molecule, and all of the polymer molecules have the same or substantially the same ethylene-to-comonomer ratio. The homogeneously branched ethylene interpolymers that can be used in the practice of this invention include linear ethylene interpolymers, and substantially linear ethylene interpolymers.

Included amongst the homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. That is, homogeneously branched linear ethylene interpolymers lack long chain branching, just as is the case for the linear low density polyethylene polymers or linear high density polyethylene polymers, made using uniform branching distribution polymerization processes. Commercial examples of homogeneously branched linear ethylene/α-olefin interpolymers include TAFMER polymers supplied by the Mitsui Chemical Company and EXACT polymers supplied by ExxonMobil Chemical Company.

The substantially linear ethylene interpolymers used in the present invention are described in U.S. Pat. Nos. 5,272,236; 5,278,272; 6,054,544; 6,335,410 and 6,723,810; the entire contents of each are herein incorporated by reference. The substantially linear ethylene interpolymers are those in which the comonomer is randomly distributed within a given interpolymer molecule, and in which all of the interpolymer molecules have the same or substantially the same ethylene/comonomer ratio within that interpolymer. In addition, the substantially linear ethylene interpolymers are homogeneously branched ethylene interpolymers having long chain branching. The long chain branches have the same comonomer distribution as the polymer backbone, and can have about the same length as the length of the polymer backbone. "Substantially linear," typically, is in reference to a polymer that is substituted, on average, with 0.01 long chain branches per 1000 carbons to 3 long chain branches per 1000 carbons. The length of a long chain branch is longer than the carbon length of a short chain branch formed from the incorporation of one comonomer into the polymer backbone.

Some polymers may be substituted with 0.01 long chain branches per 1000 carbons to 1 long chain branch per 1000 carbons, or from 0.05 long chain branches per 1000 carbons to 1 long chain branch per 1000 carbons, or from 0.3 long chain branches per 1000 carbons to 1 long chain branch per 1000 carbons. Commercial examples of substantially linear polymers include the ENGAGE polymers and AFFINITY polymers (both available from The Dow Chemical Company).

The substantially linear ethylene interpolymers form a unique class of homogeneously branched ethylene polymers. They differ substantially from the well-known class of conventional, homogeneously branched linear ethylene interpolymers, described by Elston in U.S. Pat. No. 3,645,992, and, moreover, they are not in the same class as conventional heterogeneous Ziegler-Natta catalyst polymerized linear ethylene polymers (for example, ultra low density polyethylene (ULDPE), linear low density polyethylene (LLDPE) or high density polyethylene (HDPE) made, for example, using the technique disclosed by Anderson et al. in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

The homogeneously branched, substantially linear ethylene interpolymers useful in the invention have excellent processability, even though they have a relatively narrow molecular weight distribution. Surprisingly, the melt flow ratio ($I_{10}/I_2$), according to ASTM D 1238, of the substantially linear ethylene interpolymers can be varied widely, and essentially independently of the molecular weight distribution ($M_w/M_n$ or MWD). This surprising behavior is completely contrary to conventional homogeneously branched linear ethylene interpolymers, such as those described, for example, by Elston in U.S. Pat. No. 3,645,992, and heterogeneously branched conventional Ziegler-Natta polymerized linear polyethylene interpolymers, such as those described, for example, by Anderson et al., in U.S. Pat. No. 4,076,698. Unlike substantially linear ethylene interpolymers, linear ethylene interpolymers (whether homogeneously or heterogeneously branched) have rheological properties, such that, as the molecular weight distribution increases, the $I_{10}/I_2$ value also increases.

"Long chain branching (LCB)" can be determined by conventional techniques known in the industry, such as $^{13}C$ nuclear magnetic resonance ($^{13}C$ NMR) spectroscopy, using, for example, the method of Randall (Rev. Micromole. Chem. Phys., C29 (2&3) 1989, p. 285-297). Two other methods are gel permeation chromatography, coupled with a low angle laser light scattering detector (GPC-LALLS), and gel permeation chromatography, coupled with a differential viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301 (1949) and Rudin, A., Modern Methods of Polymer Characterization, John Wiley & Sons, New York (1991) pp. 103-112.

In contrast to "substantially linear ethylene polymer," "linear ethylene polymer" means that the polymer lacks measurable or demonstrable long chain branches, that is, the polymer is substituted with an average of less than 0.01 long chain branch per 1000 carbons.

The homogeneous branched ethylene polymers useful in the present invention will preferably have a single melting peak, as measured using differential scanning calorimetry (DSC), in contrast to heterogeneously branched linear ethylene polymers, which have two or more melting peaks, due to the heterogeneously branched polymer's broad branching distribution.

Homogeneously branched linear ethylene interpolymers are a known class of polymers which have a linear polymer backbone, no measurable long chain branching and a narrow molecular weight distribution. Such polymers are interpolymers of ethylene and at least one $\alpha$-olefin comonomer of from 3 to 20 carbon atoms, and are preferably copolymers of ethylene with a C3-C20 a-olefin, and are more preferably copolymers of ethylene with propylene, 1-butene, 1-pentene, 1-hexene, 1-heptene or 1-octene, and even more preferably, propylene, 1-butene, 1-hexene or 1-octene.

This class of polymers is disclosed for example, by Elston in U.S. Pat. No. 3,645,992, and subsequent processes to produce such polymers using metallocene catalysts have been developed, as shown, for example, in EP 0 129 368, EP 0 260 999, U.S. Pat. No. 4,701,432; U.S. Pat. No. 4,937,301; U.S. Pat. No. 4,935,397; U.S. Pat. No. 5,055,438; and WO 90/07526, each incorporated herein by reference. The polymers can be made by conventional polymerization processes (for example, gas phase, slurry, solution, and high pressure).

In a preferred embodiment of the invention, an ethylene-based polymer used for Component B is an ethylene/$\alpha$-olefin interpolymer, comprising at least one $\alpha$-olefin. In another embodiment, the interpolymer further comprises at least one diene.

In one embodiment, the ethylene/$\alpha$-olefin interpolymer has a molecular weight distribution ($M_w/M_n$) less than, or equal to, 10, and preferably less than, or equal to, 5.

Comonomers include, but are not limited to, propylene, isobutylene, 1-butene, 1-pentene, 1-hexene, 3-methyl-1-pentene, 4-methyl-1-pentene, and 1-octene, non-conjugated dienes, polyenes, butadienes, isoprenes, pentadienes, hexadienes (for example, 1,4-hexadiene), octadienes, styrene, halo-substituted styrene, alkyl-substituted styrene, tetrafluoroethylenes, vinylbenzocyclobutene, naphthenics, cycloalkenes (for example, cyclopentene, cyclohexene, cyclooctene), and mixtures thereof. Typically and preferably, the ethylene is copolymerized with one $C_3$-$C_{20}$ $\alpha$-olefin. Preferred comonomers include propene, 1-butene, 1-pentene, 1-hexene, 1-heptene and 1-octene, and more preferably include propene, 1-butene, 1-hexene and 1-octene.

Illustrative $\alpha$-olefins include propylene, 1-butene, 1-pentene, 1-hexene, 4-methyl-1-pentene, 1-heptene, 1-octene, 1-nonene and 1-decene. The $\alpha$-olefin is desirably a C3-C10 $\alpha$-olefin. Preferably, the $\alpha$-olefin is propylene, 1-butene, 1-hexene or 1-octene. Illustrative interpolymers include ethylene/propylene (EP) copolymers, ethylene/butene (EB) copolymers, ethylene/hexene (EH) copolymers, ethylene/octene (EO) copolymers, ethylene/$\alpha$-olefin/diene modified (EAODM) interpolymers, such as ethylene/propylene/diene modified (EPDM) interpolymers and ethylene/propylene/octene terpolymers. Preferred copolymers include EP, EB, EH and EO polymers.

Suitable diene and triene comonomers include 7-methyl-1,6-octadiene; 3,7-dimethyl-1,6-octadiene; 5,7-dimethyl-1,6-octadiene; 3,7,11-trimethyl-1,6,10-octatriene; 6-methyl-1,5-heptadiene; 1,3-butadiene; 1,6-heptadiene; 1,7-octadiene; 1,8-nonadiene; 1,9-decadiene; 1,10-undecadiene; norbornene; tetracyclododecene; or mixtures thereof; and preferably butadiene; hexadienes; and octadienes; and most preferably 1,4-hexadiene; 1,9-decadiene; 4-methyl-1,4-hexadiene; 5-methyl-1,4-hexadiene; dicyclopentadiene; and 5-ethylidene-2-norbornene (ENB).

Additional unsaturated comonomers include 1,3-butadiene, 1,3-pentadiene, norbornadiene, and dicyclopentadiene; C8-40 vinyl aromatic compounds including sytrene, o-, m-, and p-methylstyrene, divinylbenzene, vinylbiphenyl, vinylnapthalene; and halogen-substituted C8-40 vinyl aromatic compounds such as chlorostyrene and fluorostyrene.

In another embodiment, the ethylene/α-olefin interpolymer has a melt index ($I_2$) from 0.1 g/10 min to 100 g/10 min, preferably from 0.2 g/10 min to 50 g/10 min, and more preferably from 0.5 g/10 min to 20 g/10 min, and even and more preferably from 0.5 g/10 min to 10 g/10 min, as determined using ASTM D-1238 (190° C., 2.16 kg load). All individual values and subranges from 0.1 g/10 min to 100 g/10 min are includes herein and disclosed herein.

In another embodiment, the ethylene/α-olefin interpolymer has a density less than, or equal to, 0.93 g/cc, preferably less than, or equal to, 0.92 g/cc, and more preferably less than, or equal to, 0.91 g/cc. In another embodiment, the ethylene/α-olefin interpolymer has a density greater than, or equal to, 0.85 g/cc, preferably greater than, or equal to, 0.86 g/cc, and more preferably greater than, or equal to, 0.87 g/cc.

In another embodiment, the ethylene/α-olefin interpolymer has a density from 0.85 g/cm$^3$ to 0.93 g/cm$^3$, or from 0.86 g/cm$^3$ to 0.92 g/cm$^3$, or from 0.87 g/cm$^3$ to 0.91 g/cm$^3$. All individual values and subranges from 0.85 g/cm$^3$ to 0.93 g/cm$^3$ are included herein and disclosed herein.

An ethylene-based polymer may have a combination of two or more suitable embodiments as described herein.

An ethylene/α-olefin interpolymer may have a combination of two or more suitable embodiments as described herein.

Propylene-Based Polymers

Suitable propylene-based polymers include, but are not limited to, propylene interpolymers and reactor copolymers of polypropylene (RCPP). The propylene interpolymer can be a random or block copolymer, or a propylene-based terpolymer.

Suitable comonomers for polymerizing with propylene include ethylene, 1-butene, 1-pentene, 1-hexene, 1-heptene, 1-octene, 1-nonene, 1-decene, 1-unidecene, 1-dodecene, as well as 4-methyl-1-pentene, 4-methyl-1-hexene, 5-methyl-1-hexene, vinylcyclohexane, and styrene. The preferred comonomers include ethylene, 1-butene, 1-hexene, and 1-octene.

Optionally, the propylene-based polymer comprises monomers having at least two double bonds, which are preferably dienes or trienes. Suitable diene and triene comonomers include 7-methyl-1,6-octadiene; 3,7-dimethyl-1,6-octadiene; 5,7-dimethyl-1,6-octadiene; 3,7,11-trimethyl-1,6,10-octatriene; 6-methyl-1,5-heptadiene; 1,3-butadiene; 1,6-heptadiene; 1,7-octadiene; 1,8-nonadiene; 1,9-decadiene; 1,10-undecadiene; norbornene; tetracyclododecene; or mixtures thereof; and preferably butadiene; hexadienes; and octadienes; and most preferably 1,4-hexadiene; 1,9-decadiene; 4-methyl-1,4-hexadiene; 5-methyl-1,4-hexadiene; dicyclopentadiene; and 5-ethylidene-2-norbornene (ENB).

Additional unsaturated comonomers include 1,3-pentadiene, norbornadiene, and dicyclopentadiene; C8-40 vinyl aromatic compounds including sytrene, o-, m-, and p-methylstyrene, divinylbenzene, vinylbiphenyl, vinylnapthalene; and halogen-substituted C8-40 vinyl aromatic compounds such as chlorostyrene and fluorostyrene.

The propylene-based interpolymers of particular interest include propylene/ethylene, propylene/1-butene, propylene/1-hexene, propylene/4-methyl-1-pentene, propylene/1-octene, propylene/ethylene/1-butene, propylene/ethylene/ENB, propylene/ethylene/1-hexene, propylene/ethylene/1-octene, propylene/styrene, and propylene/ethylene/styrene.

Suitable propylene-based polymers are formed by means within the skill in the art, for example, using single site catalysts (metallocene or constrained geometry) or Ziegler Natta catalysts. The propylene and optional comonomers, such as ethylene or alpha-olefin monomers are polymerized under conditions within the skill in the art, for instance, as disclosed by Galli, et al., Angew. Macromol. Chem., Vol. 120, 73 (1984), or by E. P. Moore, et al. in Polypropylene Handbook, Hanser Publishers, New York, 1996, particularly pages 11-98.

Preferably, the propylene-based polymer has a melt flow rate (MFR) in the range of 0.1 to 100 g/10 min, more preferably in range of 0.2 to 50 g/10 min, and more preferably 0.5 to 20 g/10 min, and even more preferably 1 to 10 g/10 min, as measured in accordance with ASTM D 1238 at 230° C./2.16 kg.

The propylene-based polymer used in the present invention may be of any molecular weight distribution (MWD). Propylene-based polymers of broad or narrow MWD are formed by means within the skill in the art. Propylene-based polymers having a narrow MWD can be advantageously provided by visbreaking or by manufacturing reactor grades (non visbroken) using single-site catalysis, or by both methods.

The propylene-based polymer can be reactor-grade, visbroken, branched or coupled to provide increased nucleation and crystallization rates. The term "coupled" is used herein to refer to propylene-based polymers which are rheology-modified, such that they exhibit a change in the resistance of the molten polymer to flow during extrusion (for example, in the extruder immediately prior to the annular die). Whereas "visbroken" is in the direction of chain-scission, "coupled" is in the direction of crosslinking or networking. As an example of coupling, a couple agent (for example, an azide compound) is added to a relatively high melt flow rate polypropylene polymer, such that after extrusion, the resultant polypropylene polymer composition attains a substantially lower melt flow rate than the initial melt flow rate. Preferably, for coupled or branched polypropylene, the ratio of subsequent MFR to initial MFR is less than, or equal, to 0.7:1, more preferably less than or equal to 0.2:1.

A suitable branched propylene-based polymers for use in the present invention are commercially available, for instance from Montell North America, under the trade designations PROFAX PF-611 and PF-814. Alternatively, suitable branched or coupled propylene-based polymers can be prepared by means, within the skill in the art, such as by peroxide or electron-beam treatment, for instance as disclosed by DeNicola et al., in U.S. Pat. No. 5,414,027 (the use of high energy (ionizing) radiation in a reduced oxygen atmosphere); EP 0 190 889 to Himont (electron beam irradiation of isotactic polypropylene at lower temperatures); U.S. Pat. No. 5,464,907 (Akzo Nobel NV); EP 0 754 711 Solvay (peroxide treatment); and U.S. patent application Ser. No. 09/133,576, filed Aug. 13, 1998 (azide coupling agents). Each of these patents/applications is incorporated herein by reference.

Suitable propylene-based polymers include VERSIFY polymers (The Dow Chemical Company), VISTAMAXX polymers (ExxonMobil Chemical Co.), LICOCENE polymers (Clariant), EASTOFLEX polymers (Eastman Chemical Co.), REXTAC polymers (Hunstman), ADFLEX polymers (Basell), BORSOFT polymers (Borealis), VESTOPLAST polymers (Degussa), Solvay's KS 4005 polypropylene copolymer; Solvay's KS 300 polypropylene terpolymer; and INSPIRE™ polymers available from The Dow Chemical Company. Other suitable polymers include propylene-α-olefins block copolymers and interpolymers, and other propylene based block copolymers and interpolymers known in the art. Suitable propylene-based polymers include those described in U.S. Provisional Application No. 60/988,999 (filed Nov. 19, 2007), incorporated herein by reference.

In another embodiment, the propylene-based polymer is a propylene/α-olefin interpolymer, comprising at least one α-olefin. In another embodiment, the interpolymer further comprises at least one diene. In another embodiment, the propylene-based interpolymer is a propylene/ethylene interpolymer.

Preferred comonomers include, but are not limited to, ethylene, isobutylene, 1-butene, 1-pentene, 1-hexene, 3-methyl-1-pentene, 4-methyl-1-pentene, 1-octene, non-conjugated dienes, polyenes, butadienes, isoprenes, pentadienes, hexadienes (for example, 1,4-hexadiene), octadienes, styrene, halo-substituted styrene, alkyl-substituted styrene, tetrafluoroethylenes, vinylbenzocyclobutene, naphthenics, cycloalkenes (for example, cyclopentene, cyclohexene, cyclooctene), and mixtures thereof. Typically and preferably, the comonomer is an ethylene or a $C_4$-$C_{20}$ α-olefin. Preferred comonomers include ethylene, 1-butene, 1-pentene, 1-hexene, 1-heptene and 1-octene, and more preferably include ethylene, 1-butene, 1-hexene and 1-octene.

In another embodiment, the propylene-based polymer is a propylene/α-olefin interpolymer, which has a molecular weight distribution less than, or equal to, 5, and preferably less than, or equal to, 4, and more preferably less than, or equal to, 3. In a further embodiment, the propylene/α-olefin interpolymer has a molecular weight distribution from 1.1 to 5, or from 1.5 to 4.5, or from 2 to 4. All individual values and subranges from about 1 to 5 are included herein and disclosed herein.

In another embodiment, the propylene/α-olefin interpolymer has a melt flow rate (MFR) less than, or equal to 100 g/10 min, preferably less than, or equal to 50 g/10 min, and more preferably less than, or equal to 20 g/10 min, and even more preferably less than, or equal to 10 g/10 min, as measured in accordance with ASTM D 1238 at 230° C./2.16 kg. In another embodiment, propylene/α-olefin interpolymer has a melt flow rate (MFR) greater than, or equal to 0.1 g/10 min, preferably greater than, or equal to 0.2 g/10 min, more preferably greater than, or equal to 0.5 g/10 min, and even more preferably greater than, or equal to 1 g/10 min, as measured in accordance with ASTM D 1238 at 230° C./2.16 kg.

In another embodiment, the propylene/α-olefin interpolymer has a melt flow rate (MFR) from 0.1 to 100 grams/10 minutes, more preferably from 0.2 to 50 grams/10 minutes, more preferably from 0.5 to 20 grams/10 min, and even more preferably from 1 to 10 grams/10 min, as measured in accordance with ASTM D 1238 at 230° C./2.16 kg. All individual values and subranges from 0.1 to 100 grams/10 min are included herein and disclosed herein.

In another embodiment, the propylene/α-olefin interpolymer has a density less than, or equal to, 0.93 g/cc, preferably less than, or equal to, 0.91 g/cc, and more preferably less than, or equal to, 0.89 g/cc. In another embodiment, the propylene/α-olefin interpolymer has a density greater than, or equal to, 0.83 g/cc, preferably greater than, or equal to, 0.84 g/cc, and more preferably greater than, or equal to, 0.85 g/cc.

In another embodiment, the propylene/α-olefin interpolymer has a density from 0.83 $g/cm^3$ to 0.93 $g/cm^3$, or from 0.84 $g/cm^3$ to 0.91 $g/cm^3$, or from 0.85 $g/cm^3$ to 0.89 $g/cm^3$. All individual values and subranges from 0.83 $g/cm^3$ to 0.93 $g/cm^3$, are included herein and disclosed herein.

In another embodiment, the propylene-based polymer is a propylene/ethylene interpolymer, which has a molecular weight distribution less than, or equal to, 5, preferably less than, or equal to, 4, and more preferably less than, or equal to 3. More preferably the propylene/ethylene interpolymer has a molecular weight distribution from 1.1 to 5, or from 1.5 to 4.5, or from 2 to 4. All individual values and subranges from about 1 to 5 are included herein and disclosed herein.

In another embodiment, the propylene/ethylene interpolymer has a melt flow rate (MFR) less than, or equal to, 100 g/10 min, preferably less than, or equal to, 50 g/10 min, and more preferably less than, or equal to, 20 g/10 min, and even more preferably less than, or equal to, 10 g/10 min, as measured in accordance with ASTM D 1238 at 230° C./2.16 kg. In another embodiment, propylene/ethylene interpolymer has a melt flow rate (MFR) greater than, or equal to, 0.1 g/10 min, preferably greater than, or equal to, 0.2 g/10 min, more preferably greater than, or equal to, 0.5 g/10 min, and even more preferably greater than, or equal to 1 g/10 min, as measured in accordance with ASTM D 1238 at 230° C./2.16 kg.

In another embodiment, the propylene/ethylene interpolymer has a melt flow rate (MFR) from 0.1 to 100 grams/10 minutes, more preferably from 0.2 to 50 grams/10 minutes, more preferably from 0.5 to 20 grams/10 min, and even more preferably from 1 to 10 grams/10 min, as measured in accordance with ASTM D 1238 at 230° C./2.16 kg. All individual values and subranges from 0.1 to 100 grams/10 min are included herein and disclosed herein.

In another embodiment, the propylene/ethylene interpolymer has a density less than, or equal to, 0.93 g/cc, preferably less than, or equal to, 0.91 g/cc, and more preferably less than, or equal to, 0.89 g/cc. In another embodiment, the propylene/ethylene interpolymer has a density greater than, or equal to, 0.83 g/cc, preferably greater than, or equal to, 0.84 g/cc, and more preferably greater than, or equal to, 0.85 g/cc.

In another embodiment, the propylene/ethylene interpolymer has a density from 0.83 $g/cm^3$ to 0.93 $g/cm^3$, or from 0.84 $g/cm^3$ to 0.91 $g/cm^3$, or from 0.85 $g/cm^3$ to 0.89 $g/cm^3$. All individual values and subranges from 0.83 $g/cm^3$ to 0.93 $g/cm^3$, are included herein and disclosed herein.

A propylene-based polymer may have a combination of two or more suitable embodiments as described herein.

A propylene-based interpolymer may have a combination of two or more suitable embodiments as described herein.

A propylene/α-olefin interpolymer may have a combination of two or more suitable embodiments as described herein.

A propylene/ethylene interpolymer may have a combination of two or more suitable embodiments as described herein.

Anhydride-Containing Compounds and Carboxylic Acid-Containing Compounds and Initiators for Use in the Preparation of Component A), and Component C)

A variety of radically graftable species may be attached to the polymer, either individually, or as relatively short grafts. These species include, but are not limited to, maleic anhydride, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, and the respective esters, imides, salts, and Diels-Alder adducts of these compounds.

A thermal grafting process is one method for reaction, however, other grafting processes may be used, such as photo initiation, including different forms of radiation, e-beam, or redox radical generation.

The functionalization may also occur at the terminal unsaturated group (for example, vinyl group) or an internal unsaturation group, when such groups are present in the polymer.

In a preferred embodiment, the olefin-based polymers are grafted with maleic anhydride. The grafted maleic anhydride olefin-based polymer may or may not contain small amounts of hydrolysis product and/or other derivatives In another embodiment, the amount of maleic anhydride used in the grafting reaction of the composition is less than, or equal to, 10 phr (parts per hundred, based on the weight of the olefin-based polymer), preferably less than 5 phr, and more preferably from 0.05 to 10 phr, and even more preferably from 0.05 to 5 phr. All individual values and subranges from 0.05 phr to 10 phr are included herein and disclosed herein.

In another embodiment, the amount of initiator used in the grafting reaction is less than, or equal to, 10 millimoles radicals per 100 grams olefin-based polymers, preferably, less than, or equal to, 6 millimoles radicals per 100 grams olefin-based polymers, and more preferably, less than, or equal to, 3 millimoles radicals per 100 grams olefin-based polymers. All individual values and subranges from 0.01 millimoles to 10 millimoles radicals per 100 grams olefin-based polymers are included herein and disclosed herein.

In another embodiment, the amount of maleic anhydride constituent grafted on the olefin-based polymers is greater than 0.05 weight percent (based on the weight of the composition), as determined by titration analysis. In a further embodiment, this amount is greater than 0.1 weight percent, and in yet a further embodiment, this amount is greater than 0.15 weight percent. In a preferred embodiment, 0.05 weight percent to 2.0 weight percent of maleic anhydride is grafted. All individual values and subranges greater than 0.05 weight percent are considered within the scope of this invention, and are disclosed herein.

In another embodiment, grafted polymers comprise from 0.05 weight percent to 1 weight percent grafted maleic anhydride, based on the total weight of composition.

The maleic anhydride, as well as many other unsaturated heteroatom containing species, may be grafted to the polymer by any conventional method, typically in the presence of a free radical initiator, for example the peroxide and azo classes of compounds, etc., or by ionizing radiation. Organic initiators are preferred, such as any one of the peroxide initiators, such as, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy)hexane, 2,5-dimethyl-2,5-di(tert-butyl peroxy)-3-hexyne, lauryl peroxide, and tert-butyl peracetate. A suitable azo compound is 2,2'-azobis(isobutyronitrile). The organic initiators have varying reactivities at different temperatures, and may generate different types of free radicals for grafting. One skilled in the art may select the appropriate organic initiator as needed for the grafting conditions.

The amount and type of initiator, the amount of maleic anhydride, as well as reaction conditions, including temperature, time, shear, environment, additives, diluents, and the like, employed in the grafting process, may impact the final structure of the maleated polymer. For example, the degree of maleic anhydride/succinic anhydride, their oligomers, and their derivatives, including hydrolysis products, grafted onto the grafted polymer may be influenced by the aforementioned considerations. Additionally, the degree and type of branching, and the amount of crosslinking, may also be influenced by the reaction conditions and concentrations. In general, it is preferred that crosslinking during the maleation process be minimized. The resulting structure, will in turn, affect the properties and use of the final product. Typically, the amount of initiator and maleic anhydride employed will not exceed that, which is determined to provide the desired level of maleation and desired melt flow, each required for the functionalized polymer and its subsequent use.

The grafting reaction should be performed under conditions that maximize grafts onto the polymer backbone, and minimize side reactions, such as the homopolymerization of the grafting agent, which is not grafted to the olefin interpolymer. The grafting reaction may be performed in the melt, in solution, in the solid-state, in a swollen-state, and the like. The maleation may be performed in a wide-variety of equipments, such as, but not limited to, twin screw extruders, single screw extruders, Brabenders, batch reactors, and the like.

Additional embodiments of the invention provide for olefin-based polymers grafted with other carbonyl-containing compounds. In one embodiment, these grafted olefin-based polymers are prepared using the same or similar amounts of grafting compound and initiator, as those used for the grafted maleic anhydride olefin-based polymers, as described above. In another embodiment, these grafted olefin-based polymers contain the same or similar levels of grafted compound as for the grafted maleic anhydride, as described above.

Additional carbonyl-containing compounds include, but are not limited to, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, esters thereof, imides thereof, salts thereof, and Diels-Alder adducts thereof.

There are several types of compounds that can initiate grafting reactions by decomposing to form free radicals, including azo-containing compounds, carboxylic peroxyacids and peroxyesters, alkyl hydroperoxides, and dialkyl and diacyl peroxides, among others. Many of these compounds and their properties have been described (Reference: J. Branderup, E. Immergut, E. Grulke, eds. "Polymer Handbook," 4th ed., Wiley, New York, 1999, Section II, pp. 1-76.). It is preferable for the species that is formed by the decomposition of the initiator to be an oxygen-based free radical. It is more preferable for the initiator to be selected from carboxylic peroxyesters, peroxyketals, dialkyl peroxides, and diacyl peroxides. Some of the more preferable initiators, commonly used to modify the structure of polymers, are listed below. Also shown below, are the respective chemical structures and the theoretical radical yields. The theoretical radical yield is the theoretical number of free radicals that are generated per mole of initiator.

| Initiator Name | Initiator Structure | Theoretical Radical Yield |
|---|---|---|
| Benzoyl peroxide - | (structure) | 2 |

-continued

| Initiator Name | Initiator Structure | Theoretical Radical Yield |
|---|---|---|
| Lauroyl peroxide - | $CH_3(CH_2)_{10}C(=O)-O-O-C(=O)(CH_2)_{10}CH_3$ | 2 |
| Dicumyl peroxide - | (structure) | 2 |
| t-Butyl α-cumyl peroxide - | (structure) | 2 |
| Di-t-butyl peroxide - | (structure) | 2 |
| Di-t-amyl peroxide - | (structure) | 2 |
| t-Butyl peroxybenzoate - | (structure) | 2 |
| t-Amyl peroxybenzoate - | (structure) | 2 |
| 1,1-Bis(t-butylperoxy)-3,3,5-trimethylcyclohexane | (structure) | 4 |
| α,α'-Bis(t-butylperoxy)-1,3-diisopropylbenzene - | (structure) | 4 |
| α,α'-Bis(t-butylperoxy)-1,4-diisopropylbenzene | (structure) | 4 |
| 2,5-Bis(t-butylperoxy)-2,5-dimethylhexane | (structure) | 4 |

| Initiator Name | Initiator Structure | Theoretical Radical Yield |
|---|---|---|
| 2,5-Bis(t-butylperoxy)-2,5-dimethyl-3-hexyne | $H_3C-\underset{CH_3}{\overset{CH_3}{C}}-O-O-\underset{CH_3}{\overset{CH_3}{C}}-C\equiv C-\underset{CH_3}{\overset{CH_3}{C}}-O-O-\underset{CH_3}{\overset{CH_3}{C}}-CH_3$ | 4 |

Applications

The invention provides an article comprising at least one component formed from an inventive composition. In one embodiment, the article is an adhesive, a pipe, a film, a geomembrane, a molded part, an automotive part, a footwear component, a coating, or a foam laminate, an automotive skin, a roofing construction article, a powder coating, a powder slush molding, a computer component, artificial leather, artificial turf, a fiber, a coated fiber, or a fabric. In another embodiment, the article is a tie layer between extruded sheets, a tie layer between extruded films, a tie layer between extruded profiles, a tie layer between cast sheets, tie layer between cast films, or tie layer between cast profiles. An inventive article may comprise a combination of two or more suitable embodiments as described herein.

The invention also provides an adhesive comprising at least one component formed from an inventive composition.

The invention also provides a pipe comprising at least one component formed from an inventive composition.

The invention also provides a film comprising at least one layer formed from an inventive composition.

The invention also provides an extruded sheet comprising at least one layer formed from an inventive composition.

The invention also provides a painted substrate, wherein the substrate is formed from an inventive composition. In one embodiment, the paint comprises at least one additive selected from the group consisting of an acrylic polymer, an alkyd resin, a cellulose-based material, a melamine resin, a urethane resin, a carbamate resin, a polyester resin, a vinyl acetate resin, an epoxy a polyol, an alcohol, and combinations thereof. In another embodiment, the paint is a water-based paint. In another embodiment, the paint is an organic solvent based paint. The painted substrate may comprise a combination of two or more suitable embodiments as described herein.

The invention also provides a dispersion comprising an inventive composition. In one embodiment, the dispersion further comprises at least one additive selected from the group consisting of an acrylic polymer, an alkyd resin, a cellulose-based material, a melamine resin, a urethane resin, a carbamate resin, a polyester resin, a vinyl acetate resin, an epoxy, a polyol, an alcohol, and combinations thereof. In another embodiment, the dispersion is a water-based dispersion. In another embodiment, the dispersion is an organic solvent-based dispersion. The dispersion may comprise a combination of two or more suitable embodiments as described herein.

The invention also provides a RH welded article comprising at least one component formed from an inventive composition.

The invention also provides an over-molded article comprising the following: (a) a substrate formed from a composition comprising a polar polymer, and (b) a molded overlay formed from an inventive composition. In another embodiment, the polar polymer is selected from polycarbonate (PC), ABS, PC/ABS, or nylon. In another embodiment, the over-molded article is in the form of a grip, handle or belt. The invention also provides an over-molded article comprising the following: (a) a substrate formed from an inventive composition, and (b) a molded overlay formed from a composition comprising a polar polymer. In another embodiment, the polar polymer is selected from polycarbonate (PC), ABS, PC/ABS, or nylon. In another embodiment, the over-molded article is in the form of a grip, handle or belt. An over-molded article may comprise a combination of two or more suitable embodiments as described herein.

The invention also provides a laminated structure comprising a first layer and a second layer, and wherein the first layer is formed from an inventive composition, and wherein the second layer is formed from a composition comprising a polar polymer. In one embodiment, one of the layers is in the form of a foam. In another embodiment, one of the layers is in the form of a fabric. In another embodiment, the second layer is formed from a composition comprising a polycarbonate. In another embodiment, the laminated structure is in the form of an awning, a tarp, an automobile skin, or a steering wheel. A laminated structure may comprise a combination of two or more suitable embodiments as described herein.

The invention also provides an injection molded article comprising at least one component formed from an inventive composition.

The invention also provides a molded article comprising a first component and a second component, and wherein the first component is formed from a composition comprising a polar polymer, and wherein the second component is formed from an inventive composition. In one embodiment, the article is in the form of an automobile skin, an appliqué, a footwear component, a conveyor belt, a timing belt, artificial leather, or a consumer durable.

The invention also provides a footwear article comprising at least one component formed from an inventive composition. In one embodiment, the article is selected from the group consisting of a shoe outsole, a shoe midsole, a shoe unitsole, an overmolded article, a natural leather article, a synthetic leather article, an upper, a laminated article, a coated article, a boot, a sandal, galoshes, a plastic shoe, and combinations thereof.

The invention also provides a thermoformed sheet comprising at least one layer formed from an inventive composition.

The invention also provides an automotive part comprising at least one layer formed from an inventive composition. In one embodiment, the part is an instrument panel or a door panel. In another embodiment, the part is selected from airbags, head rests, arm rests, carpet underlayment, bumper components, vertical panels, soft TPO skins, or interior trim.

The invention also provides artificial leather comprising at least one component formed from an inventive composition.

The invention also provides artificial turf comprising at least one component formed from an inventive composition.

An inventive article may comprise a combination of two or more embodiments as described herein.

Other potential applications are adhesive layers in multilayer films, multilayer extrusion coating, blow molded bottles, blow molded bottles with barrier, bi-component fibers, coated steel pipes, and aluminum panels.

Additional articles include a carpet component; a wire sheath; a cable; a protective apparel; a coating; a coated article; synthetic and natural leather articles, and adhesives to KEVLAR, an awning; a tarp; a roofing construction article (for example, adhesives to epoxy, urethane or acrylic-based substrates for all roofing applications, such as insulation bonding, liquid roofing, façade sealant, expansion joints, wet-room sealants, pitched roof, acrylics-adhered roof, bitumen bonding, and PUR-adhered refurbishment); a steering wheel; a powder coating; a powder slush molding; a consumer durable; a grip; a handle; a computer component; a belt; appliqués; a conveyor or timing belt; lubricants and engine oil components; fibers; films, film wraps of various sizes; fabrics; injection molded objects, such as injection molded toys, including paintable toys; artificial turf; rotational cast moldings (typically, each with a particle size of less than 950 micron), consumer durables, grips, handles, belts, adhesives for fabric/polyurethane (PU) foam laminates (for example, appliqués and footwear), adhesives (hot melt or otherwise), for example, for binding an abrasion layer to an extruded article, raincoats and similar protective apparel.

Specific applications include adhesives to polyurethane films and foams, and adhesives to polyesters; dyes, paint adhesives and paint adhesion enablers; weldability applications; automotive interiors and exteriors; compatibilizers for polymer compositions; and toughening agents for polymer compositions.

Additional applications include adhesion of co-extruded films, where one or more substrates are compatible or reactive with hydroxyl groups, and the lamination of olefin-based films to other polar substrates (for example, glass lamination). Further applications include artificial leather to be adhered to polar substrates, such as polyurethane, polyvinyl chloride (PVC), and others. Artificial leather is used for automotive interiors, and is typically adhered to polyurethane for seating, head liners.

The inventive compositions are also suitable for Health & Hygiene products, such as wipes, cleaning tissues, foams, or directly dyable fibers. The inventive compositions can be used to enhance hydrophilicity of the elastomer for novel membrane structures for separation or breathability. The inventive compositions are also suitable for use as self-adhearable elastomers onto metal or textile structures for automotive. As discussed above, the inventive compositions are well suited for blends and compatibilizers, with enhanced interaction towards polar polymers, such as TPU, EVA, PVC, PC, PET, PLA (polylactic acid), polyamide esters, and PBT. Such bends can be used for novel compounds for footwear, automotive, consumer, durables, appliances, electronic housing, apparel, and conveyor belts.

The inventive compositions can also serve as compatibilizers between natural fibers and other polyolefins for use in applications, such as wood binding formulations or cellulose binding formulations. The inventive compositions are also useful in blends with one or more polyether block amides, such as Pebax® polymers available from Arkema. The compatibilized blends may also be used as impact modifiers for nylon. In addition, amine groups of the inventive compatibilized blends may be protonated or alkylated to form quartnary nitrogens or ionomers for use as anti-microbials.

The inventive compositions can also be used to enhance the interaction to fillers, such as silica, carbon black or clay, for use in formulations for toners, tires, coatings, or other compounds. The inventive compositions may also be used in engine oil viscosity modifiers, engine oil dispersants, dyable or printable fibers for apparel, paint adhesion promoters, adhesives for glass, metal and PVDC barrier resins, dispersions, components in primers, and sizing agents.

An inventive article may comprise a combination of two or more embodiments as described herein.

Definitions

Any numerical range recited herein, includes all values from the lower value to the upper value, in increments of one unit, provided that there is a separation of at least two units between any lower value and any higher value. As an example, if it is stated that a compositional, physical or mechanical property, such as, for example, molecular weight, viscosity, melt index, etc., is from 100 to 1,000, it is intended that all individual values, such as 100, 101, 102, etc., and sub ranges, such as 100 to 144, 155 to 170, 97 to 200, etc., are expressly enumerated in this specification. For ranges containing values which are less than one, or containing fractional numbers greater than one (for example, 1.1, 1.5, etc.), one unit is considered to be 0.0001, 0.001, 0.01 or 0.1, as appropriate. For ranges containing numbers less than ten (for example, 1 to 5), one unit is typically considered to be 0.1. These are only examples of what is specifically intended, and all possible combinations of numerical values between the lowest value and the highest value enumerated, are to be considered to be expressly stated in this application. Numerical ranges have been recited, as discussed herein, in reference to melt index, melt flow rate, molecular weight distribution, density and other properties.

The term "composition," as used herein, includes a mixture of materials which comprise the composition, as well as reaction products and decomposition products formed from the materials of the composition.

The terms "blend" or "polymer blend," as used herein, mean a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "polymer," as used herein, refers to a polymeric compound prepared by polymerizing monomers whether of the same or a different type. The generic term polymer thus embraces the term homopolymer, employed to refer to polymers prepared from only one type of monomer; and the term interpolymer as defined hereinafter.

The term "interpolymer," as used herein, refers to polymers prepared by the polymerization of at least two different types of monomers. The generic term interpolymer thus includes copolymers, employed to refer to polymers prepared from two different monomers; and polymers prepared from more than two different types of monomers.

The term, "olefin-based polymer," as used herein, refers to a polymer that comprises more than 50 mole percent polymerized olefin monomer, for example ethylene or propylene (based on the total amount of polymerizable monomers), and optionally may comprise at least one polymerized comonomer.

The term, "ethylene-based polymer," as used herein, refers to a polymer that comprises more than 50 mole percent polymerized ethylene monomer (based on the total amount of polymerizable monomers), and optionally may comprise at least one polymerized comonomer.

The term, "ethylene-based interpolymer," as used herein, refers to an interpolymer that comprises more than 50 mole percent polymerized ethylene monomer (based on the total amount of polymerizable monomers), and at least one polymerized comonomer.

The term, "ethylene/α-olefin interpolymer," as used herein, refers to an interpolymer that comprises more than 50 mole percent polymerized ethylene monomer (based on the total amount of polymerizable monomers), and at least one polymerized α-olefin.

The term, "propylene-based polymer," as used herein, refers to a polymer that comprises more than 50 mole percent polymerized propylene monomer (based on the total amount of polymerizable monomers), and optionally may comprise at least one polymerized comonomer.

The term, "propylene-based interpolymer," as used herein, refers to an interpolymer that comprises more than 50 mole percent polymerized propylene monomer (based on the total amount of polymerizable monomers), and at least one polymerized comonomer.

The term, "propylene/α-olefin interpolymer," as used herein, refers to an interpolymer that comprises more than 50 mole percent polymerized propylene monomer (based on the total amount of polymerizable monomers), and at least one polymerized α-olefin.

The term, "propylene/ethylene interpolymer," as used herein, refers to an interpolymer that comprises more than 50 mole percent polymerized propylene monomer (based on the total amount of polymerizable monomers), polymerized ethylene monomer, and, optionally, at least one additional polymerized comonomer.

The term "anhydride-containing compound," as used herein, refers to an organic compound containing at least one anhydride moiety.

The term "carboxylic acid-containing compound," as used herein, refers to an organic compound containing at least one carboxylic acid moiety.

The phrase "one or more grafted anhydride-containing compounds and/or one or more grafted carboxylic acid-containing compounds," as used herein, refers to the reaction product(s) of one or more anhydride-containing compounds and/or one or more carboxylic acid-containing compounds, which is/are covalently bonded to the backbone of an ethylene-based polymer or a propylene-based polymer. For example, a "grafted maleic anhydride" refers to a structure bonded to a polymer backbone, and which contains at least one chemical moiety as shown below, and may include hydrolyzed derivatives and other related structures:

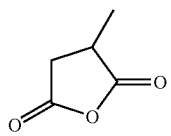

Test Methods

Density is determined in accordance with American Society for Testing and Materials (ASTM) procedure ASTM D792-00.

Melt index (I2) in g/10 min, is measured using ASTM D-1238-04, Condition 190° C./2.16 kg (ethylene-based polymers). The notation "I10" refers to a melt index, in g/10 min, measured using ASTM D-1238-04, Condition 190° C./10.0 kg. The notation "I21" refers to a melt index, in g/10 min, measured using ASTM D-1238-04, Condition 190° C./21.6 kg. Ethylene-based polymers are typically measured at 190° C., while propylene-based polymers are typically measured at 230° C. MFR refers to the melt flow rate for propylene-based polymers, and is measured using ASTM D-1238-04, condition 230° C./2.16 kg.

Determination of Grafted MAH Levels—Titration Method

The reagents used in the titration were as follows:
Methanol for organic trace analysis (Merck Nr. 106011)
Xylene p.A. (Merck Nr. 108681)
Maleic acid p.A. (Merck Nr. 800380)
Succinic acid p.A. (Merck Nr. 100682)
Potassium hydroxide p.A. (Merck Nr. 105021)
Thymolblue (Merck Nr. 108176)
Acetone p.A. (Merck Nr. 100012)
Hydrochloric acid (Merck Nr. 100319)
Indicator solution: thymolblue (0.04 g) was dissolved in 100 mL methanol.
Hydrochloric acid: hydrochloric acid (10 mL) was added to 90 mL water.
Methanolic potassium hydroxide solution: KOH (5.6 g) was dissolved in 1000 mL methanol. The solution contained about 0.1 mol/L KOH.

The amount of MAH grafts was determined by titration of maleic acid as follows. Maleic acid (58.0 mg) was dissolved in 100 ml hot xylene. After adding a couple of drops of the indicator solution, the solution was titrated with methanolic potassium hydroxide solution, until the solution color changed from yellow to blue (theoretically 10 mL of the hydroxide solution is needed). The "KOH factor" was determined from Equation I below.

$$F = 5.8 \times A/E \qquad \text{(Eqn. I)},$$

where F=Factor KOH, A=the amount of methanolic potassium hydroxide solution (in mL), and E=the weighted amount of maleic acid MA (in mg).

Sample Preparation

The polymer sample (5 g polymer) was combined with acetone (100 ml), and the mixture was refluxed for 90 minutes, and then allowed to cool to room temperature. After cooling, the polymer was isolated by filtration. The polymer was washed twice with "25 mL" distilled water. Hydrochloric acid (50 ml, 3% in water) was added to the polymer, and the mixture was refluxed for 60 minutes, and then allowed to cool to room temperature. After cooling, the polymer was isolated and washed with water, until the wash water tested neutral. Then the polymer was dried overnight at room temperature in air.

Titration

The dried polymer (1-2 g) was dissolved in hot xylene using a water bath.

Complete dissolution occurred in about 30 minutes. A couple of drops of indicator solution were added to the polymer solution, and the solution was titrated with the methanolic potassium hydroxide solution, until the solution color changed from yellow to blue (a 10 mL buret is typically used for the titration). The amount of grafted MAH was determined using Equation II below.

$$MA[\%] = 5.8 \times A \times 100/F \times E \qquad \text{(Eqn. II)},$$

where F=Factor KOH, A=the amount of methanolic potassium hydroxide solution (in mL), E=weighted polymer (in mg).

The following examples illustrate, but do not, either explicitly or by implication, limit the present invention.

EXAMPLES

The following polymers were used in the examples below. These polymers are typically stabilized with one or more antioxidants and/or other stabilizers.

E1 is an ethylene/1-octene copolymer with a density of 0.868 g/cc, and a melt index (I2) of 0.5 g/10 min.

P1 is a propylene/ethylene copolymer with a density of 0.858 g/cc, and a melt flow rate (MFR) of 2 g/10 min.

P2 is a propylene/ethylene copolymer with a density of 0.888 g/cc, and a melt flow rate (MFR) of 2 g/10 min.

E2 an ethylene/1-octene copolymer with a density of 0.918 g/cc, and a melt index (I2) of 2.3 g/10 min.

E3 is an ethylene/1-hexene copolymer with a density of 0.918 g/cc, and a melt index (I2) of 2.3 g/10 min.

E4 is an ethylene/1-octene copolymer with a density of 0.941 g/cc, and a melt index (I2) of 0.85 g/10 min.

HDPE with a density of 0.958 g/cc, and a melt index (I2) of 38 g/10 min.

E5 is an ethylene butyl acrylate copolymer with a density of 0.93 g/cc, and a melt index (I2) of 2.0 g/10 min.

P3 is an in-reactor blend of polypropylene homopolymer with ethylene-propylene rubber.

The solid phase grafting process and reactive extrusion process are each described in Registration Number: 10 2007 043 972.7 (German Patent Office), filing date of Sep. 11, 2007, fully incorporated herein by reference.

Adhesive Composition I

The HDPE (I2>20 g/10 min), in powder form, was grafted with 1 to 3 weight percent maleic anhydride (MAH), based on the total weight of the composition, using a solid phase grafting process, to form a grafted MAH polyethylene, and some unreacted MAH remained. The grafted MAH polyethylene (9.17 g) mixture (grafted MAH polyethylene and unreacted MAH) was compounded with an ethylene/1-octene copolymer (58.4 g, density=0.918 g/cc, and melt index (I2)=2.3 g/10 min), and a third polymer component (29.7 g), selected from E1, P1 or P3 to form Examples 1, 2 and 3, respectively. The compounded mixture was then reacted further in a reactive extrusion process to form each adhesive composition. The amount of grafted MAH in the adhesive composition was from 0.2 to 0.3 weight percent, based on the total weight of the composition.

Adhesive Composition II

Another adhesive composition can be prepared as follows. The HDPE (I2>20 g/10 min), in powder form, is grafted with 1 to 3 weight percent maleic anhydride (MAH), based on the total weight of the composition, using a solid phase grafting process, to form a grafted MAH polyethylene and some unreacted MAH remains. The grafted MAH polyethylene (9.17 g) mixture (grafted MAH polyethylene and unreacted MAH) is compounded with an ethylene/1-octene copolymer (90.83 g, density=0.918 g/cc, and melt index (I2)=2.3 g/10 min). The compounded mixture is then reacted further in a reactive extrusion process, to form a second mixture. Next, a third polymer component, selected from E1, P1 or P3, is added to the second mixture to form each respective sample. The amount of grafted MAH in the adhesive composition is from 0.2 to 0.3 weight percent, based on the total weight of the composition.

Preparation of Multi-Layered Pipes

Multilayer pipes were produced with the following structure from inside to outside, as shown below. YPAREX is a tie layer resin supplied by DSM.

E4/Adhesive Comp./Aluminum/YPAREX/E4

For each pipe, a layer formed from the Adhesive Composition I (as discussed above) was placed between a layered formed from an ethylene/1-octene copolymer (E4) and a layer formed from aluminum. In addition, for each pipe, a layer formed from YPAREX adhesive was placed between a layered formed from the aluminum, and a layer formed from the ethylene/1-octene copolymer (E4).

The five layer pipe may be formed by shaping an aluminum strip to form a tube, and welding the tube along its two longitudinal edges. Next, a plastic inner layer is fixedly applied to the inside of the metal tube, and the plastic outer layer is fixedly applied at the outside of the metal tube. Each plastic layer contains a respective coextruded adhesive layer and an ethylene-based polymer layer. The melt temperature for the extrusion of the inner adhesive layer is from 230° C. to 240° C.

The peel strength between the inner ethylene-based polymer layer and the aluminum layer of each pipe (E4/Adhesive Comp./Aluminum/YPAREX/E4) was measured in accordance with DIN 16836:2005-03. The test method is also described in Arbeitsblatt DVGW W 542 Paragraph 3.4.9.2. Each peel strength was measured on a "16 mm outer diameter pipe." Each data point is a mean value from five measurements. A minimum initial peel strength required after production is 50 N/cm. Results are shown in Table 2 below.

TABLE 2

| | Peel Strength in N/cm after Pipe Production | | | | | | |
|---|---|---|---|---|---|---|---|
| Inner Adhesive | Initial after production | 3 weeks | 6 weeks | 9 weeks | 12 weeks | 15 weeks, 2500 hours | 12 weeks, no temperature cycle |
| Reference | 42.90 | 61.27 | 67.17 | 73.16 | 69.64 | 65.33 | 46.29 |
| Ex. 1 | 54.93 | 66.87 | 59.78 | 71.37 | 67.98 | 66.98 | 66.75 |
| Ex. 2 | 71.72 | 80.34 | 71.87 | 72.02 | 69.19 | 63.12 | 86.60 |
| Ex. 3 | 71.49 | 39.56 | 44.83 | 41.45 | 51.11 | 45.01 | 67.15 |

The reference adhesive is used for multilayer pipes with EVOH barrier layer, and contains 70% polyethylene, 20% EBA (ethylene butylacrylate) and 10% of an MAH-grafted ethylene-base polymer. This adhesive does not provide sufficient initial peel strength.

The adhesive of Example 1 shows good long term performance in peel strength after the temperature cycle test. The adhesive of Example 2 provides sufficient initial peel strength, and shows good peel strength retention over time. The adhesive of Example 3 shows good peel strength retention.

The inventive compositions (Examples 1-3) have improved retention of the high initial peel strength in a multilayer pipe, after a temperature cycling test, at a 20° C./95° C. cycle, in water, at 5000 cycles, and 30 minutes per cycle. Multi-layered pipes with retained and/or improved adhesion to both aluminum and polyethylene, after being subjected to temperature changes, will have improved integrity and improved long-term behavior.

Although the invention has been described in detail in the preceding examples, this detail is for the purpose of illustration, and is not to be construed as a limitation on the invention, as described in the following claims.

The invention claimed is:

1. A composition comprising the reaction product of a mixture comprising the following:
   A) at least one functionalized ethylene-based polymer, formed by reacting a high density polyethylene, with a melt index (I2) greater than 20 g/10 min, with at least one anhydride-containing compound and/or at least one carboxylic acid-containing compound;
   B) at least one ethylene-based interpolymer with a density from 0.91 g/cc to 0.93 g/cc;
   C) at least one anhydride-containing compound and/or at least one carboxylic acid-containing compound; and
   wherein the composition comprises from 0.05 to 1.0 weight percent, based on the total weight of the composition, of one or more grafted anhydride-containing compounds and/or one or more grafted carboxylic acid-containing compounds, and
   wherein the melt index (I2) of Component A is greater than the melt index (I2) of Component B, and
   wherein the composition has a density from 0.88 g/cc to 0.91 g/cc.

2. The composition of claim 1, wherein the at least one functionalized ethylene-based polymer of Component A is formed by a solid phase grafting reaction.

3. The composition of claim 1, wherein Component A is present in an amount from 3 to 20 weight percent, based on the total weight of the composition.

4. The composition of claim 1, wherein the at least one functionalized ethylene-based polymer of Component A is formed from an ethylene homopolymer.

5. The composition of claim 1, wherein Component B is present in an amount greater than, or equal to, 40 weight percent, based on the total weight of the composition.

6. The composition of claim 1, wherein the ethylene-based polymer of Component B is an ethylene/α-olefin interpolymer.

7. The composition of claim 1, wherein the composition comprises from 0.1 to 0.8 weight percent, based on the total weight of the composition, of one or more grafted anhydride-containing compounds and/or one or more grafted carboxylic acid-containing compounds.

8. The composition of claim 1, further comprising at least one ethylene-based interpolymer or at least one propylene-based interpolymer.

9. The composition of claim 8, wherein the ethylene-based interpolymer or the propylene-based interpolymer is present in an amount from 10 to 50 weight percent, based on the total weight of the composition.

10. The composition of claim 1, wherein the mixture further comprises at least one ethylene-based interpolymer or at least one propylene-based interpolymer.

11. The composition of claim 10, wherein ethylene-based interpolymer or the propylene-based interpolymer is present in an amount from 10 to 50 weight percent, based on the total weight of the composition.

12. An article comprising at least one component formed from the composition of claim 1.

13. The article of claim 12, wherein the article is an adhesive, a pipe, a film, a geomembrane, a molded part, an automotive part, a footwear component, a coating, a foam laminate, an automotive skin, a roofing construction article, a powder coating, a powder slush molding, a computer component, artificial leather, artificial turf, a fiber, a coated fiber, or a fabric.

14. An adhesive comprising at least one component formed from the composition of claim 1.

15. A pipe comprising at least one component formed from the composition of claim 1.

16. A dispersion comprising the composition of claim 1.

* * * * *